United States Patent [19]
Oshida

[11] Patent Number: 4,655,424
[45] Date of Patent: Apr. 7, 1987

[54] DEVICE FOR HOLDING ROD

[75] Inventor: Tsutomu Oshida, Ichikawa, Japan

[73] Assignee: Nifco, Inc., Yokohama, Japan

[21] Appl. No.: 796,855

[22] Filed: Nov. 12, 1985

[30] Foreign Application Priority Data

Nov. 19, 1984 [JP] Japan .............................. 59-174353[U]

[51] Int. Cl.$^4$ ............................................. F16L 3/10
[52] U.S. Cl. .................................... 248/73; 248/68.1;
248/74.2; 24/545
[58] Field of Search ...................... 248/73, 68.1, 74.1,
248/74.2, 65; 24/545, 563, 339, 336, 326

[56] References Cited

U.S. PATENT DOCUMENTS

| 2,746,112 | 5/1956 | Simon | 248/68.1 X |
| 3,944,177 | 3/1976 | Yoda | 248/73 X |
| 3,954,238 | 5/1976 | Nivet | 248/68.1 |
| 4,195,807 | 4/1980 | Llauge | 248/74.2 |
| 4,295,618 | 10/1981 | Morota et al. | 248/73 |
| 4,358,080 | 11/1982 | Wolker | 248/68.1 |
| 4,509,710 | 4/1985 | Cooper et al. | 248/73 |
| 4,541,602 | 9/1985 | Potzas | 248/68.1 X |

FOREIGN PATENT DOCUMENTS 2142376  1/1985  United Kingdom ................. 248/73

Primary Examiner—Cornelius J. Husar
Assistant Examiner—Todd G. Williams
Attorney, Agent, or Firm—Trexler, Bushnell, Giangiorgi & Blackstone, Ltd.

[57] ABSTRACT

A device for holding a rod comprises a base plate and one or more holding sections provided on the base plate, each holding section including a rigid member having a jaw portion and an elastic holding member, these members extending upright from the base plate and having a folded-back portion provided with a recess embracing the rod, whereby the lower end portion of the folded-back portion can engage to prevent accidental detachment of the rod from the holding section from being caused when an external upward force is applied to the rod.

3 Claims, 7 Drawing Figures

DEVICE FOR HOLDING ROD

FIELD OF THE INVENTION AND RELATED ART STATEMENT

This invention relates to a device for holding a rod-like member such as a pipe, or a bundle of wires, which is made of a plastic material.

Holding devices are used to hold pipes, cables, wires, rods and other similar articles along a panel or wall surface of a housing or chassis of various apparatus. Heretofore, various holding devices of this type have been proposed. An example of such a device is disclosed in Japanese Patent Publication SHO No. 59-10465. The disclosed device is a pipe holding device, and it has a plurality of parallel groove-like pipe accommodating sections formed in a base plate at the top thereof. A hook-like elastic locking member is provided such that it extends upright from the base plate and sidewise for each pipe accommodating section. The elastic locking members are staggered relative to one another in adjacent pipe accommodating sections.

With this structure of the holding device, however, a rod which is held in a holding section is readily detached therefrom when an upward force is applied to it.

OBJECT AND SUMMARY OF THE INVENTION

An object of the invention is to provide a device for holding a rod, with which a rod held in a holding section will not be readily detached therefrom by an external force applied to the rod and which also permits a rod to be fitted in a holding section with application of a comparatively light force.

To attain the above object of the invention, there is provided a device for holding a rod, which comprises a base plate having one or more holding sections open at the top, each holding section being constituted by a rigid member extending upright from the base plate and an elastic holding member having an upright portion extending from the base plate and a folded-back portion extending from the top of the upright portion and facing the rigid member, a lower portion of the folded-back portion of the holding member being formed with a recess facing the rigid member and serving to embrace part of the outer periphery of the fitted rod, the rigid member having a jaw or hook portion facing the rigid member, the lower end of the folded-back portion being adapted to engage the jaw or hook portion from below.

When a rod is forced into the holding section from above, the elastic holding member is flexed away from the rigid member until part of the outer periphery of the rod is received in the recess formed in the lower portion of the folded-back portion of the rigid portion, whereupon the elastic holding member is flexed back toward the rigid member to restore its initial state and clamp the rod in co-operation with the rigid member. When an upward force tending to detach the rod from the holding section is applied to the rod, the lower end of the folded-back portion of the holding member comes into engagement with the jaw or hook portion of the rigid member from below to provide resistance against the displacement of the holding member away from the rigid member.

The above and other objects and features of the invention will become more apparent from the detailed description of the preferred embodiment thereof when the same is read with reference to the accompanying drawings.

DETAILED DESCRIPTION OF THE PREFERRED EMBODIMENT

Figure 1:
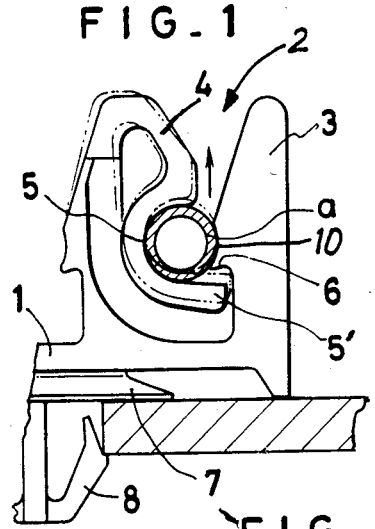
FIG. 1 is a fragmentary elevational view, partly in section, showing an embodiment of the device for holding rod, in a held state, according to the invention.
Figures 6, 7:
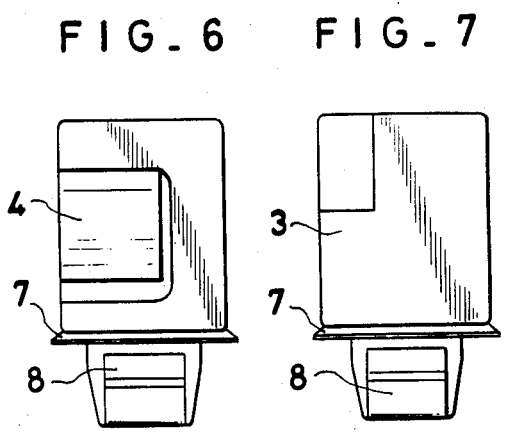
FIG. 6 is a left side view showing the same embodiment.
FIG. 7 is a right side view showing the same embodiment.
Figure 2:
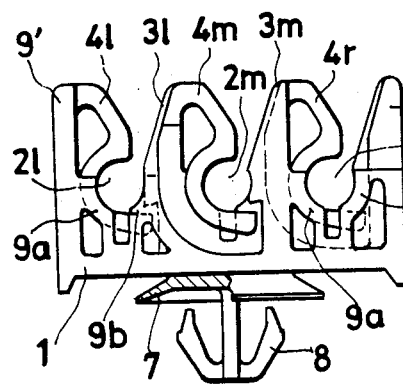
FIG. 2 is an overall elevational view, partly in section, showing the same embodiment.
Figure 3:
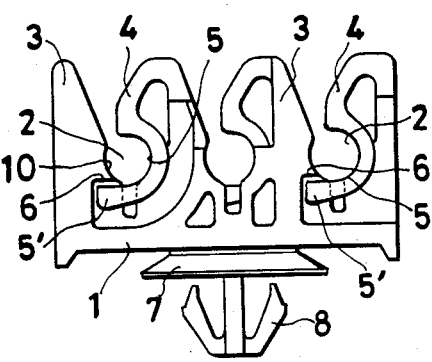
FIG. 3 is a back view showing the same embodiment.

The invention will now be described in conjunction with an embodiment thereof for holding a pipe, a cable, a wire, etc. with reference to the accompanying drawings. Referring to the Figures, the illustrated structure of the device comprises a base plate 1 with a plurality of, i.e., three in this embodiment, holding sections 2 formed on the base plate 1 and open at the top. Each holding section is constituted by a rigid member 3 and an elastic holding member 4, these members extending upright from the base plate 1. The elastic holding member 4 is formed in a lower portion of its folded-back portion with a recess to embrace substantially one half the outer periphery of a rod a which is fitted in the holding section. The rigid member 3 has a jaw portion 6, with which a lower end 5' of the folded-back portion of the holding member is engaged from below. The base plate 1, rigid members 3 and elastic holding members 4 are formed integrally from a plastic material.

The base plate 1 has a suction disk-like flange 7 and an anchor-shaped leg portion 8 depending from the center of the flange 7. The flange 7 and the leg portion 8 are formed integrally on the underside of the base plate 1. The base plate 1 may be secured to a panel by forcibly inserting the leg portion 8 through a hole formed in the panel. In this case, the flange 7 permits securement of the base plate 1 to the panel in co-operation with the leg portion 8 irrespective of any slight variation in the thickness of the panel.

Figure 4:
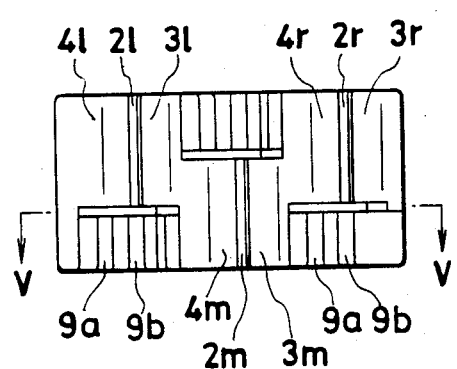
FIG. 4 is a plan view showing the same embodiment.
Figure 5:
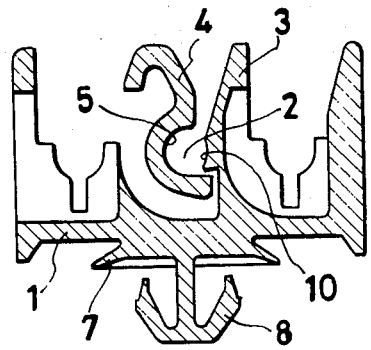
FIG. 5 is a sectional view taken along line V—V in FIG. 4.

In this embodiment, three holding sections 2 are provided on the base plate 1 at the left end, intermediate and right end positions thereof. On the side of each holding section, there are provided a pair of receiving members 9a and 9b for receiving the lower half of the outer periphery of the rod held in the holding section. The intermediate holding section 2m is staggered with respect to the left and right end holding sections 2l and 2r in the longitudinal direction of the rods to be held (FIG. 4). More specifically, in the left end holding section 2l, the elastic holding member 4l has an upright portion 9' extending upright from one of the pair of receiving members and a folded-back portion downwardly extending from the upper end of the upright portion 9'. In the intermediate holding section, the elastic holding member 4m has a folded-back portion downwardly extending from the upper end of the rigid member 3l of the left end holding section 2l. In the right end holding section, the elastic holding member 4r has a folded-back portion downwardly extending from the upper end of the rigid member 3m of the intermediate holding section.

The rigid member 3 in each holding section 2 has a recess 10, which faces the recess of the holding member 4 and receives a small portion of the outer periphery of the rod a. The portion of the rigid member 3 from the upper end thereof to the recess 10 and a corresponding upper portion of the folded-back portion of the elastic holding member 4 may be inclined in a valley-like form as illustrated to facilitate the insertion of the rod into the holding section by pushing it.

When the rod a is forced into the holding section 2 from above, the elastic holding member 4 is flexed away from the rigid member 3 until the rod is received in the recess 5 of the folded-back portion of the holding member 4, whereupon the holding member 4 is flexed back toward the rigid member 3 to clamp the inserted rod in co-operation with the rigid member 3 (as shown by the solid lines in FIG. 1). At this time, the lower half of the outer periphery of the rod is received by the pair of receiving members 9a and 9b. The receiving members 9a and 9b serve to prevent rattling of the rod and improve the mechanical strength in the thrust direction.

When an upward force tending to detach the rod from the holding section is applied to the rod (as shown by arrow in FIG. 1), the folded-back portion of the elastic holding member 4 tends to be raised together with the rod since its recess 5 embraces substantially one half of the outer periphery of the rod. As a result, however, the lower end 5' of the folded-back portion extending outwardly of the recess 5 is brought into engagement with the jaw portion 6 of the rigid member 2 (as shown by broken line in FIG. 1). This is because the lower end 5' of the folded-back portion of the elastic holding member 4 is at a position slightly below the jaw 6 in the absence of any upward force applied to the rod held in the holding section.

With the lower end 5' of the folded-back portion of the holding member brought into engagement with the jaw or hook portion 6, the folded-back portion can no longer be raised. Thus, the detachment of the rod is prevented. Of course, if a stronger upward force is applied to the rod, the end 5' of the folded-back portion is forced to clear the jaw portion 6 upwardly, thus causing flexing of the elastic holding member 4 away from the rigid member 3. The rod thus can be released from the holding section.

As has been described in the foregoing, with the device for holding rod according to the invention the rod held in a holding section will not be upwardly detached even if it experiences an upward force substantially equal to the force necessary for inserting the rod into the holding section from above.

What is claimed is:

1. A device for holding a rod comprising a base plate and one or more holding sections provided on said base plate, each of said holding sections including a rigid member extending upright from said base plate, and an elastic holding member having an upright portion extending from said base plate to an upper end and a folded-back portion extending from said upper end facing and spaced from said rigid member, said folded-back portion having a lower portion formed with a first laterally opening recess facing away from said upright portion and toward said rigid member, said rigid member having a second laterally opening recess confronting said first recess and having a hook portion below said second recess, part of the outer periphery of the rod being received in said recesses, said folded-back portion having a lower end portion extending below and outwardly of said second recess and capable of engaging with said hook portion from below when a rod is disposed in said recesses.

2. The device for holding a rod according to claim 1, which includes a plurality of adjacent holding sections comprising a plurality of rigid members and elastic holding members, each said elastic holding member being integral with the back side of the rigid member of an adjacent holding section.

3. A device for holding a rod as set forth in claim 1 wherein said lower end portion of said folded-back portion substantially abuts said upright portion.

* * * * *